US008615552B2

(12) United States Patent
Shah

(10) Patent No.: US 8,615,552 B2
(45) Date of Patent: Dec. 24, 2013

(54) SHARING CLOUD DATA RESOURCES WITH SOCIAL NETWORK ASSOCIATES

(75) Inventor: Ankur Bharatkumar Shah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 12/862,894

(22) Filed: Aug. 25, 2010

(65) Prior Publication Data

US 2012/0054280 A1   Mar. 1, 2012

(51) Int. Cl.
*G06F 15/16* (2006.01)
*G06F 15/173* (2006.01)

(52) U.S. Cl.
USPC ............................ 709/205; 709/225; 709/218

(58) Field of Classification Search
USPC ......................................... 709/205, 225, 218
See application file for complete search history.

(56) References Cited

U.S. PATENT DOCUMENTS

| 7,047,228 | B1  |   | 5/2006  | Murphy          |         |
|-----------|-----|---|---------|-----------------|---------|
| 7,467,212 | B2  | * | 12/2008 | Adams et al.    | 709/229 |
| 7,526,765 | B2  |   | 4/2009  | Lin et al.      |         |
| 7,584,281 | B2  |   | 9/2009  | Bernardin et al.|         |
| 7,634,430 | B2  |   | 12/2009 | Huberman et al. |         |
| 7,730,216 | B1  | * | 6/2010  | Issa et al.     | 709/250 |
| 7,962,426 | B2  | * | 6/2011  | Pall et al.     | 706/11  |
| 2006/0179411 | A1 |   | 8/2006  | Wolf et al.    |         |
| 2006/0242107 | A1 |   | 10/2006 | Chang et al.   |         |
| 2007/0208751 | A1 | * | 9/2007  | Cowan et al.   | 707/10  |
| 2008/0147821 | A1 | * | 6/2008  | Dietrich et al.| 709/216 |
| 2009/0106767 | A1 |   | 4/2009  | Buckler        |         |
| 2009/0216859 | A1 | * | 8/2009  | Dolling        | 709/218 |

FOREIGN PATENT DOCUMENTS

| JP | 2002056168 A | 2/2002 |
|----|--------------|--------|
| KR | 1020050044019 A | 5/2005 |

OTHER PUBLICATIONS

Alin Irimie, Desktop Database Sharing—Codename "Huron", AzureJournal—Cloud computing Blog; Nov. 19, 2008.
John Blair, "Sharing Your Database with Cross-Platform and Remote Users Information Access for Everyone," techsoup.org; Jan. 22, 2000, Copyright 2000 CompuMentor; Published under a Creative Commons Attribution-NonCommercial-NoDerivs 3.0 License. 2 pages.
IBM, "Share Cloud Compute Resources Based on Friend Status/Request in Social Communites," IP.com; Jan. 4, 2010; 4 pages.

* cited by examiner

*Primary Examiner* — Asghar Bilgrami

(74) *Attorney, Agent, or Firm* — Terry J. Carroll; Edell, Shapiro & Finnan LLC

(57) ABSTRACT

A method, computer program product, and system for sharing cloud data resources among associated users. Upon receipt of a request from an associate of a primary user to share a cloud data resource, a sharing profile of the primary user is evaluated to determine if the associate is permitted to share the requested resource, and if so, the requested resource is made available to the associate. The shared cloud data resource can be a database application, data object, data storage resource, or a portion thereof.

21 Claims, 6 Drawing Sheets

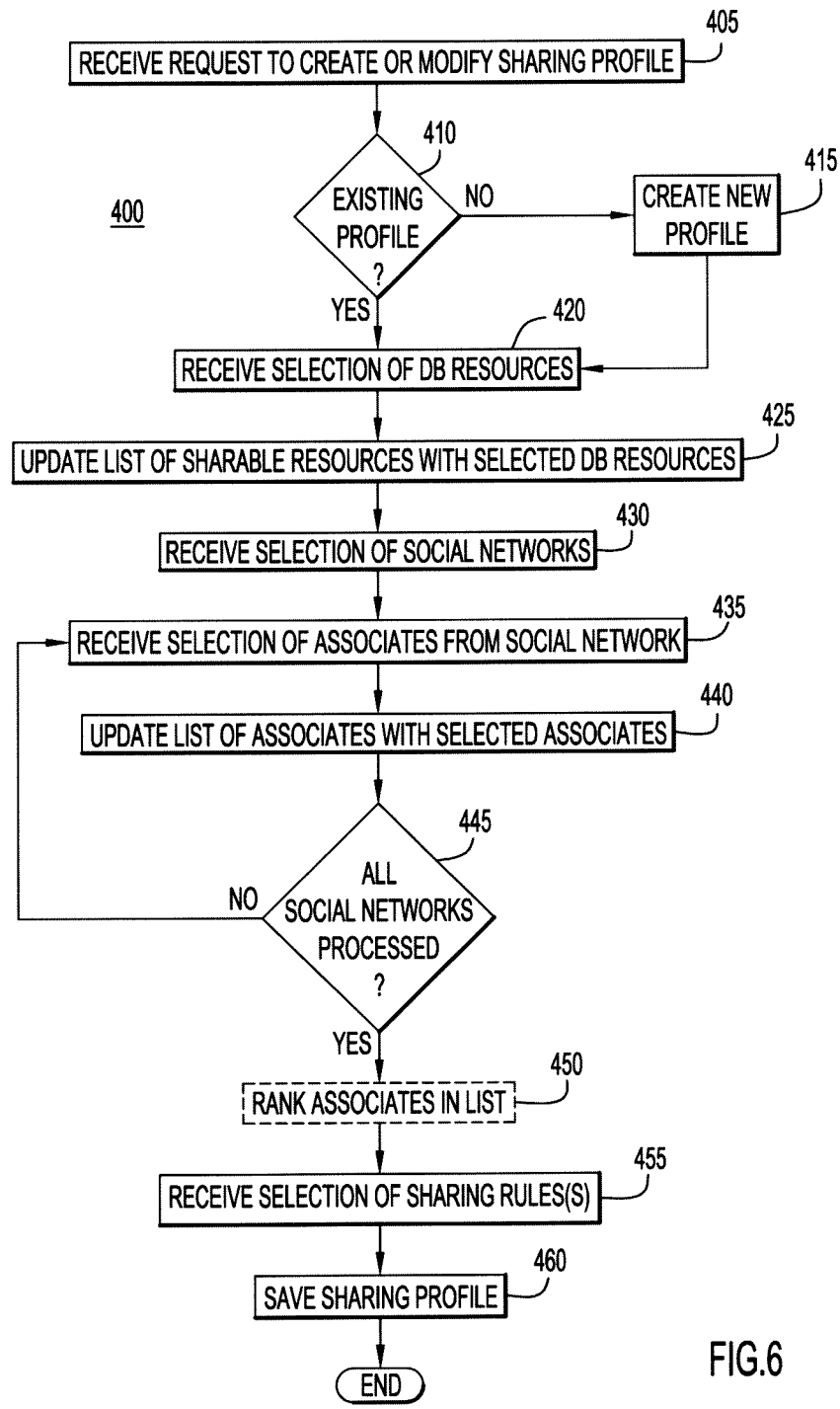

US 8,615,552 B2

SHARING CLOUD DATA RESOURCES WITH SOCIAL NETWORK ASSOCIATES

BACKGROUND

1. Technical Field

The present invention relates generally to cloud database systems, and more particularly to methods and systems for sharing cloud data resources with social network associates.

2. Discussion of Related Art

Cloud computing provides services and computer environments by combining hardware resources such as CPU, memory and storage, with software resources such as applications, in response to user requests. Cloud computing generally involves various hardware resources and software resources combined and provided to a user, and it is relatively difficult for the user to determine an appropriate usage amount of such resources. A typical cloud-computing model charges users for resources as they are used, and enables a user to reserve extra resources for an additional fee. If resources are not used, however, they may be unnecessarily idle, but if resources are insufficient, it may not be possible to complete a particular task in a timely fashion.

BRIEF SUMMARY

Accordingly, embodiments of the present invention include a method, computer program product and a system for sharing cloud data resources among associated users comprising receiving a first sharing request from an associate user to share a first cloud data resource owned by a primary user where the associate and primary users are associates of each other in a first social network, in response to receiving the first sharing request, retrieving a sharing profile associated with the primary user from a storage area, and in response to retrieving the sharing profile, evaluating the first sharing request by using the sharing profile to determine whether the first sharing request is permitted or denied, where if the first sharing request is permitted the first cloud data resource is made available for sharing by the associate user, and wherein if the first sharing request is denied the associate user is not permitted to share the first cloud data resource. The sharing profile comprises a list of sharable cloud data resources owned by the primary user, a list of associate users who are associates of the primary user from one or more social networks, and one or more sharing rules, where each sharing rule specifies a condition on which an associate user from the list of associates is permitted to share one or more cloud data resources from the list of sharable cloud data resources.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIG. 6 is a flowchart depicting an exemplary method for creating or modifying a sharing profile according to an embodiment of the present invention.

DETAILED DESCRIPTION

Figure 1:
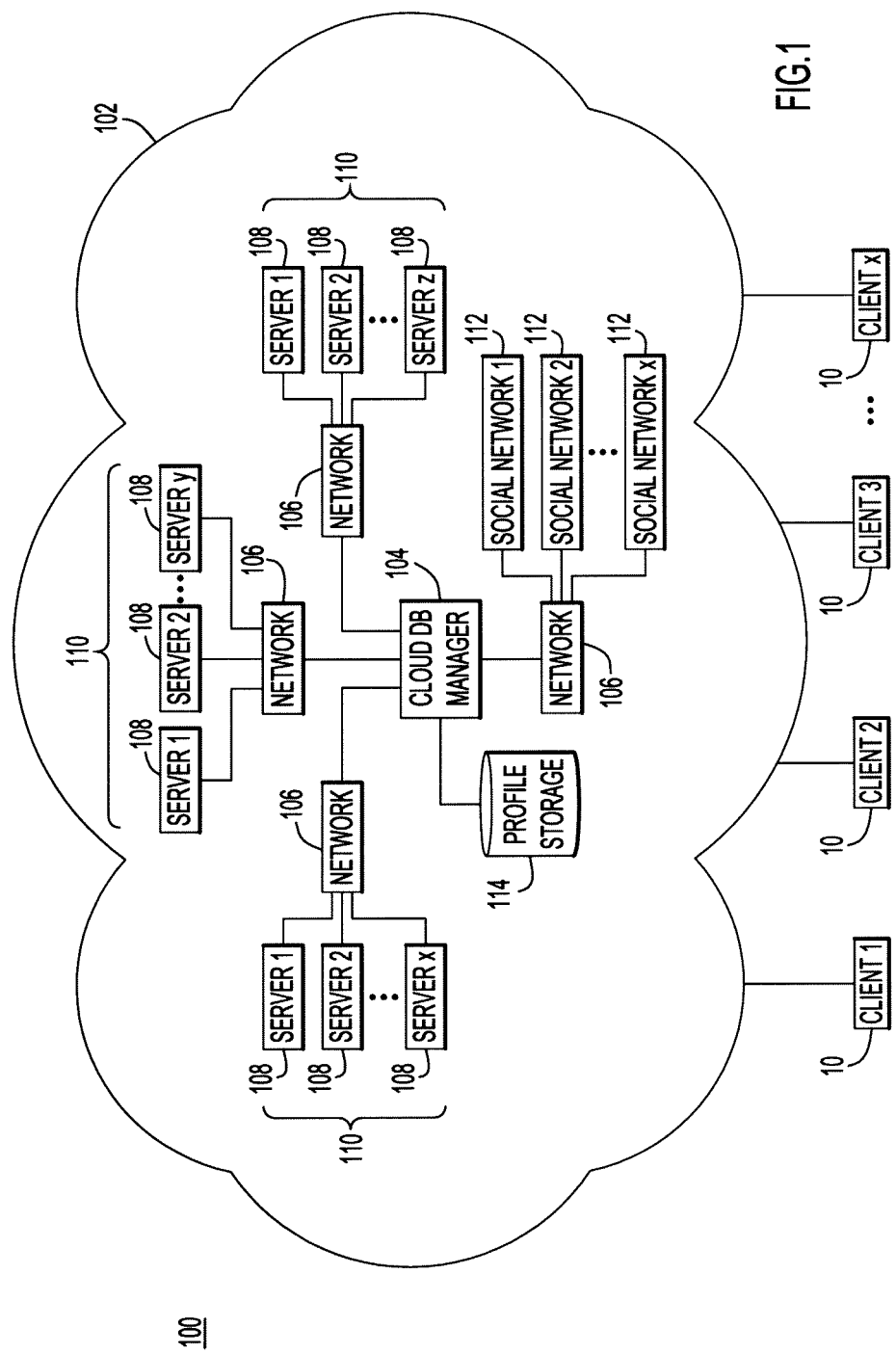
FIG. 1 is a block diagram illustrating an exemplary cloud computing system according to an embodiment of the present invention.

Referring now to the Figures, an exemplary cloud computer system 100 according to embodiments of the present invention is illustrated in FIG. 1. FIG. 1 shows a cloud data network 102 comprising a cloud database manager 104 operatively coupled to multiple networks 106, each of which comprises multiple resource servers 108 grouped into sets or clusters 110. Cloud database manager 104 is operatively coupled to one or more social networks 112 via network 106, and to profile storage 114, so that it can manage and store the sharing profiles including lists of trusted associates for its users. The social networks 112 may be any suitable social networks, public or private, on which a user may trust other users as "friends", "buddies", or "connections", for example Bebo, del.icio.us, Facebook, hi5, LinkedIn, LotusLive Connections, Myspace, Orkut, Plaxo, and Twitter. User access to the cloud network 102 is provided by any number of client devices 10.

Cloud data network 102 deploys resource servers 108 to provide hosted resources such as processors, operating systems, applications and other components that can be combined together to form virtual machines, and particularly to form cloud data resources such as processors, memory, database applications, data objects, and data storage resources. A user of the cloud data network 102 can subscribe or lease a set of resources as an instantiated virtual machine to perform various tasks, and particularly in the present embodiments, to utilize cloud data resources. The resources may be reserved for use by the subscriber such that they are not automatically re-allocated to other users, and therefore the user can be said to "own" this set of resources.

Reservation of resources by various owners, however, has drawbacks in that the user can run out of resources if she is running an intensive job that requires more data resources than she owns, for example if she is running a job that requires more processing resources or more memory. Or, for example, a user has reserved a system that is deployed with a certain operating system and database application, but has a temporary need to use a different database application on a different operating system. Instead of paying the network administrator for these temporary resources, the user prefers to borrow or share the resources of another user temporarily. From a different perspective, the user may also experience periods of down-time when she is not utilizing all of the resources she owns, for example when she is sleeping, on vacation, or simply not running resource-intensive tasks. During these periods, the user is willing to share her resources with others who may need them on a temporary basis.

Given the security concerns inherent in sharing data resources, however, the user does not want to share resources with an unknown person, but prefers to share them with a trusted person, such as a relative or associate. In the networked world, these trusted people are usually associates of the user on one or more social networks. Thus, the present embodiments provide for the automatic sharing of a primary user's cloud data resources with his or her social network associates, for example by utilizing a sharing profile that specifies which resources can be shared, which associates are permitted to borrow which resources, various terms of use such as return conditions, limitations on use (e.g., personal use as opposed to commercial use, etc.), and the like.

Generally, clients 10 provide a user interface to the functions provided by the cloud data network 102, for example, access to a virtual machine instantiated on the network 102 or to cloud database manager 104, mechanisms for querying databases, updating or maintaining databases, etc. The user can, for example, set up a sharing profile or interact with one or more social networks using a browser interface or use an interface application (e.g., an Android "app") to send a sharing request for another user's resources to the cloud database manager 104. The cloud database manager 104 manages the sharing of resources, for example by receiving sharing requests, evaluating sharing requests and temporarily re-allocating ("sharing") resources based on sharing requests, by storing sharing profiles, etc.

The user's sharing profile comprises a list of sharable cloud data resources owned by the primary user, a list of associate users who are associates of the primary user from one or more social networks, and one or more sharing rules, wherein each sharing rule specifies a condition on which an associate user member of the list of associate users is permitted to share one or more cloud data resources from the list of sharable cloud data resources, such as a return condition or a forward condition. The sharable cloud data resources can include many or all of the cloud data resources owned by the primary user, such as a virtual machine, a processor or memory, a database application, data object, data storage resource, or portions of any of the foregoing. A portion can be any usable subset of the resource, for example if the cloud data resource is a portion of a database application, the portion can be a usage percentage of the database application, or a component of the database application such as a database engine, database utility, database tool, backup unit, recovery unit, data pump, SQL loader, and a report tool. The sharable cloud data resources can be data objects, such as tables, indexes, stored queries, data files, log files, control files, and backup files, or data storage resources such as database clusters, tablespaces, or memory spaces.

Figure 2:
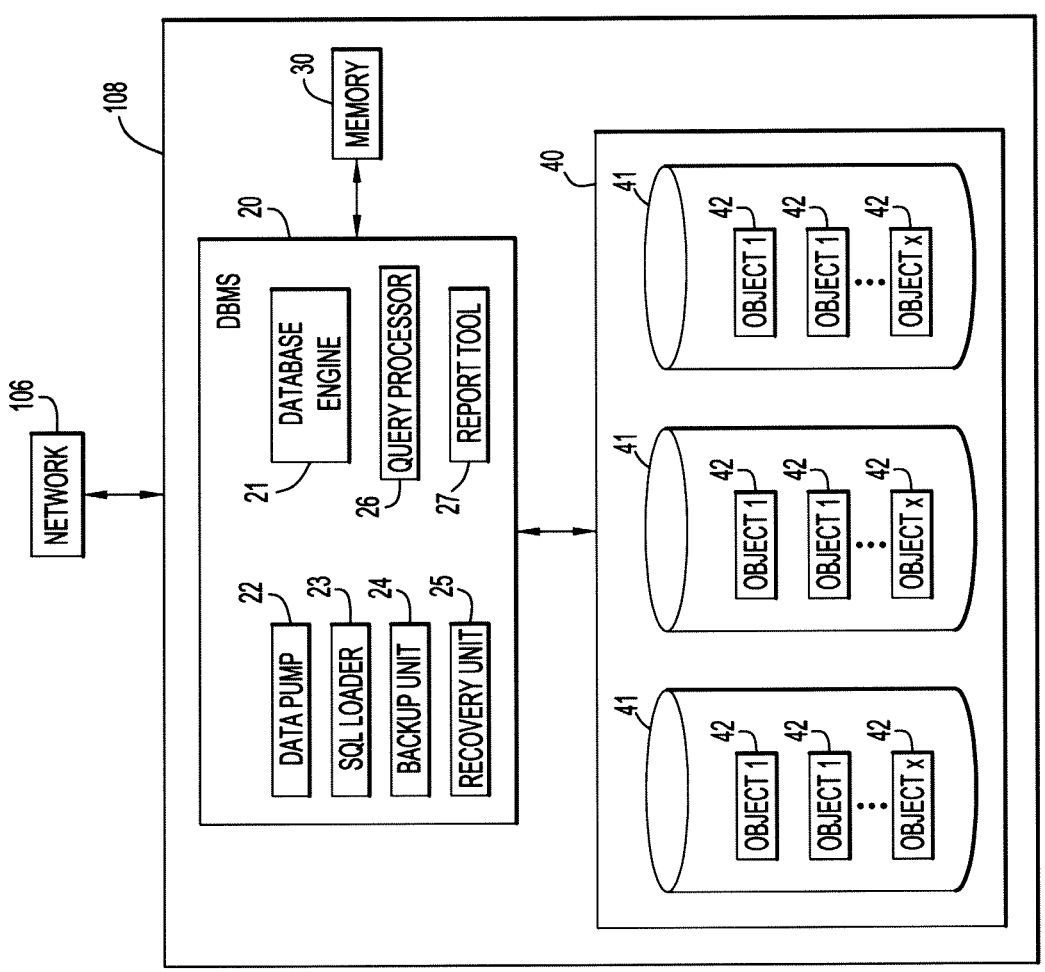
FIG. 2 is a block diagram illustrating an exemplary cloud database server comprising exemplary cloud data resources according to an embodiment of the present invention.

FIG. 2 depicts an exemplary cloud database server 108 comprising a database management system (DBMS) 20, memory 30, and data storage area 40 containing data storage resources 41. DBMS 20 comprises a database engine 21 and various components such as data pump 22, SQL loader 23, backup unit 24, recovery unit 25, query processor 26 and report tool 27. The DBMS 20 may be any suitable database management system suitable for use in cloud data network 102, for example, Amazon Relational Database Service (RDS), GoogleBase, IBM DB2, IBM Informix, Microsoft SQL Azure, etc. Memory 30 may be implemented by any conventional or other memory or storage device, and may be volatile (e.g., RAM, cache, flash, etc.), or non-volatile (e.g., ROM, hard-disk, optical storage, etc.). The memory may include any suitable storage capacity.

Data storage system 40 may be implemented by any quantity of any type of conventional or other databases (e.g., network, hierarchical, relational, object, etc.) or storage structures (e.g., files, data structures, web-based storage, disk or other storage, etc.) 41 and may comprise an enterprise data source (e.g., DB2, Oracle, IBM Enterprise Content Management (ECM) systems, ERP systems, etc.), personal and intra-organization data sources (e.g., spreadsheets (e.g., Microsoft Excel), databases (e.g., Microsoft Access, MySQL, Sharepoint, Quickr, XML, etc.)), or web-based data sources such as public databases (e.g., tax records, real estate records, court documents, etc.) and the like. The data storage system may store any desired information arranged in any fashion (e.g., tables, hierarchical, relations, objects, etc.), and may store additional information such as metadata in addition to documents. In the depicted embodiment, the data storage system 40 comprises multiple databases or storage structures 41, each of which contains multiple database objects 42, which may be, for example, one or more tables, indexes, stored queries, data files, log files, control files, or backup files.

Clients 10, cloud database manager 104, and cloud database servers 108 can be implemented in the form of a processing system, or may be in the form of software. They can be implemented by any quantity of conventional or other computer systems or devices (e.g., computer terminals, personal computers (e.g., IBM-compatible PC, Apple Mac, tablet, laptop, netbook, etc.), etc.), cellular telephones, personal data assistants (e.g., Palm Pre, Droid, iPhone, iPad, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include processors, memories, internal or external communications devices (e.g., modem, network card, etc.), displays, and input devices (e.g., physical keyboard, touch screen, mouse, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless (e.g., GPRS, EDGE, 3G, 4G, etc.), etc.).

The cloud data network 102 may include additional servers, clients, and other devices not shown, and individual components of the system may occur either singly or in multiples, for example, there may be more than one cloud database manager in the system. The cloud data network 102 may also be a node, for example a node in a computing cluster, which is connected to other nodes by suitable means, for example via a network. It is understood that any of the various components of the cloud data network 102 may be local to one another, or may be remote from and in communication with one or more other components via any suitable means, for example a network such as a WAN, a LAN, Internet, Intranet, mobile wireless (e.g., GPRS, EDGE, 3G, 4G, etc.) etc.

Figure 3:
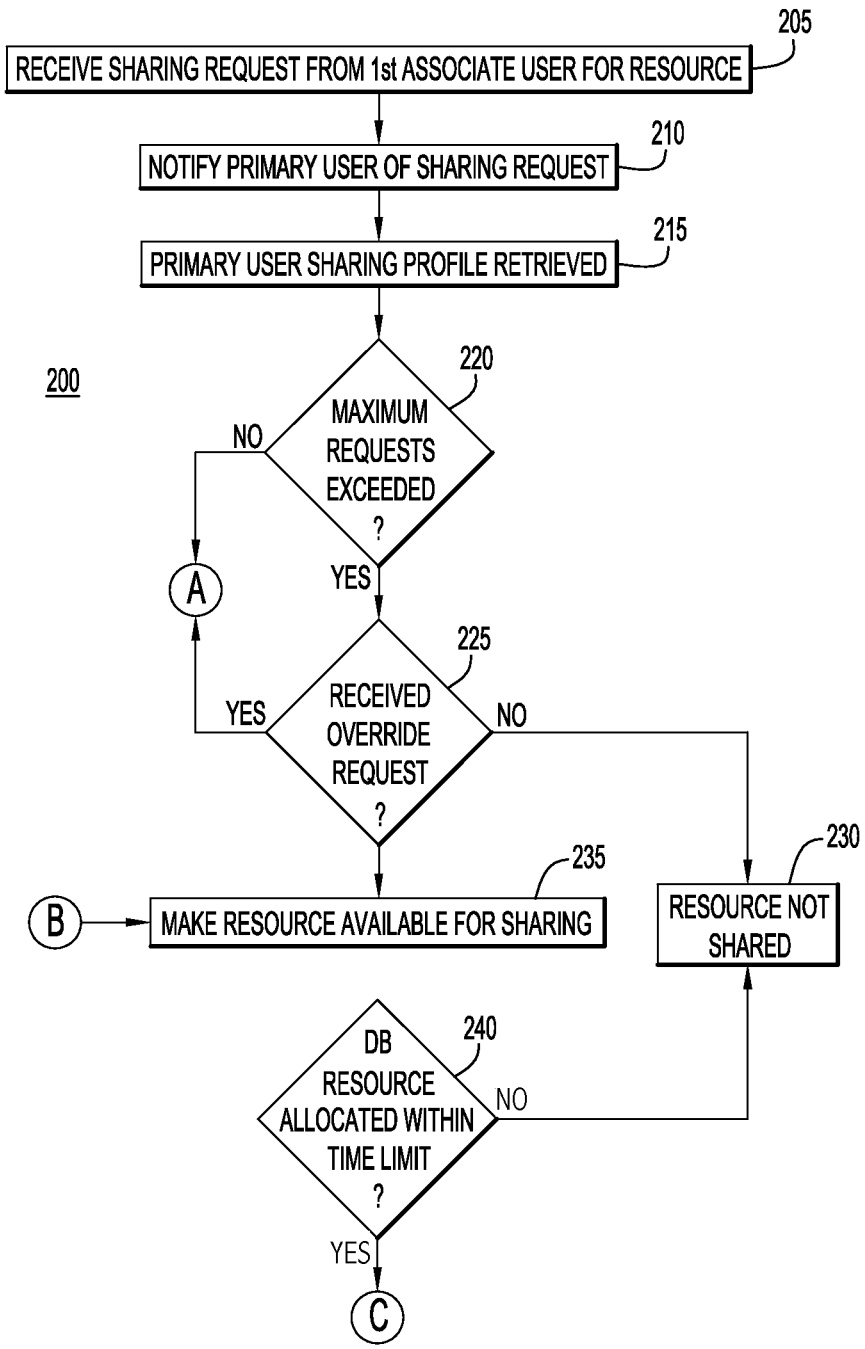
FIGS. 3 and 4 are flowcharts depicting an exemplary method for sharing cloud data resources among associated users according to an embodiment of the present invention.
Figure 4:
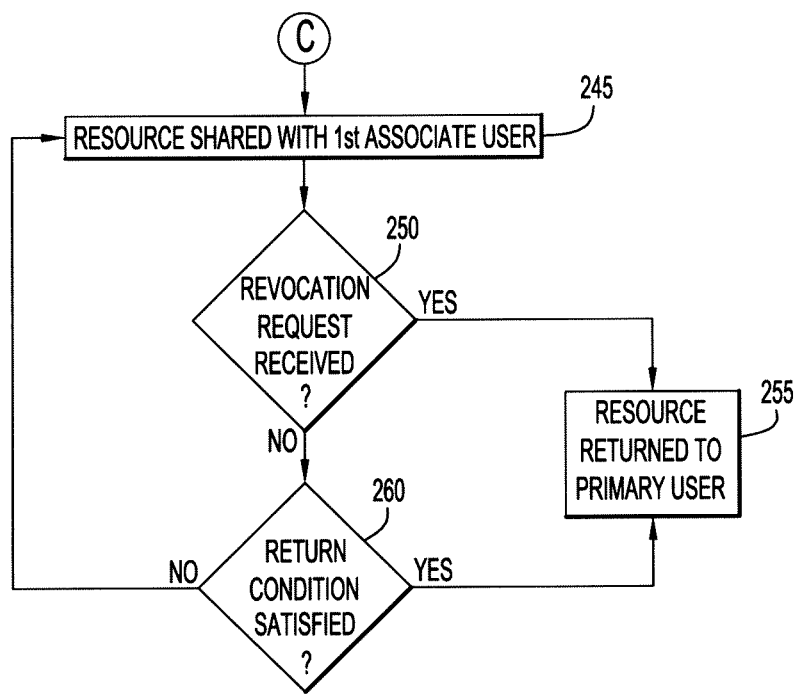

Referring now to FIGS. 3 and 4, the system that has been previously described, and particularly the cloud database manager 104 may perform the steps of FIGS. 3 and 4, in which reference numeral 200 generally designates a flow chart depicting a process for sharing cloud data resources among associated users according to an embodiment of the present invention. In step 205, the cloud database manager receives a sharing request from a first associate user for a particular database resource owned by a primary user, and in step 210 notifies the primary user of the sharing request. In step 215, the cloud database manager retrieves the sharing profile associated with the primary user from the profile storage area. In step 220, the cloud database manager determines whether a predetermined maximum number of sharing requests for a predetermined time period has been exceeded, and if no, proceeds to point A and an evaluation of the sharing profile as described below with reference to FIG. 4. The maximum number of sharing requests for the predetermined time period can be set by the primary user when creating or modifying her sharing profile, or can be set by a cloud data network administrator. If the result of step 220 is yes, in step 225 the cloud database manager determines whether an override request was received from the primary user, and if yes, proceeds to point A. If no override request was received, then the cloud database manager proceeds to step 230 and refuses to share the resource.

If the evaluation of the sharing profile is positive, then the cloud database manager re-enters process 200 at point B and in step 235 makes the requested resource available for sharing by the associate user. In step 240, the cloud database manager determines whether the first associate user has allocated the requested resource within a predetermined time limit, and if not, in step 230 refuses to share the resource. If yes, the process proceeds through point C to step 245 the requested resource is shared with the first associate user, and the primary user is notified that the resource is being shared. If the primary user sends a revocation request because she wants the resource returned, the cloud database manager receives it in step 250, and then in step 255 rescinds the sharing availability of the requested resource and returns it to the primary user. While the resource is being shared, the cloud database manager monitors the first associate user's allocation of the requested cloud data resource in step 260 to determine if a return condition is satisfied, and if yes, then in step 255 rescinds the sharing availability of the requested resource and returns it to the primary user. The return condition can be selected as a sharing rule by the primary user when creating or modifying her sharing profile, or can be set by a cloud data network administrator. The return condition can specify that the sharing continues until the first associate user returns the resource, until a particular task or function is completed, until the primary user sends a revocation request, until the expiration of a predetermined time limit, etc.

Figure 5:
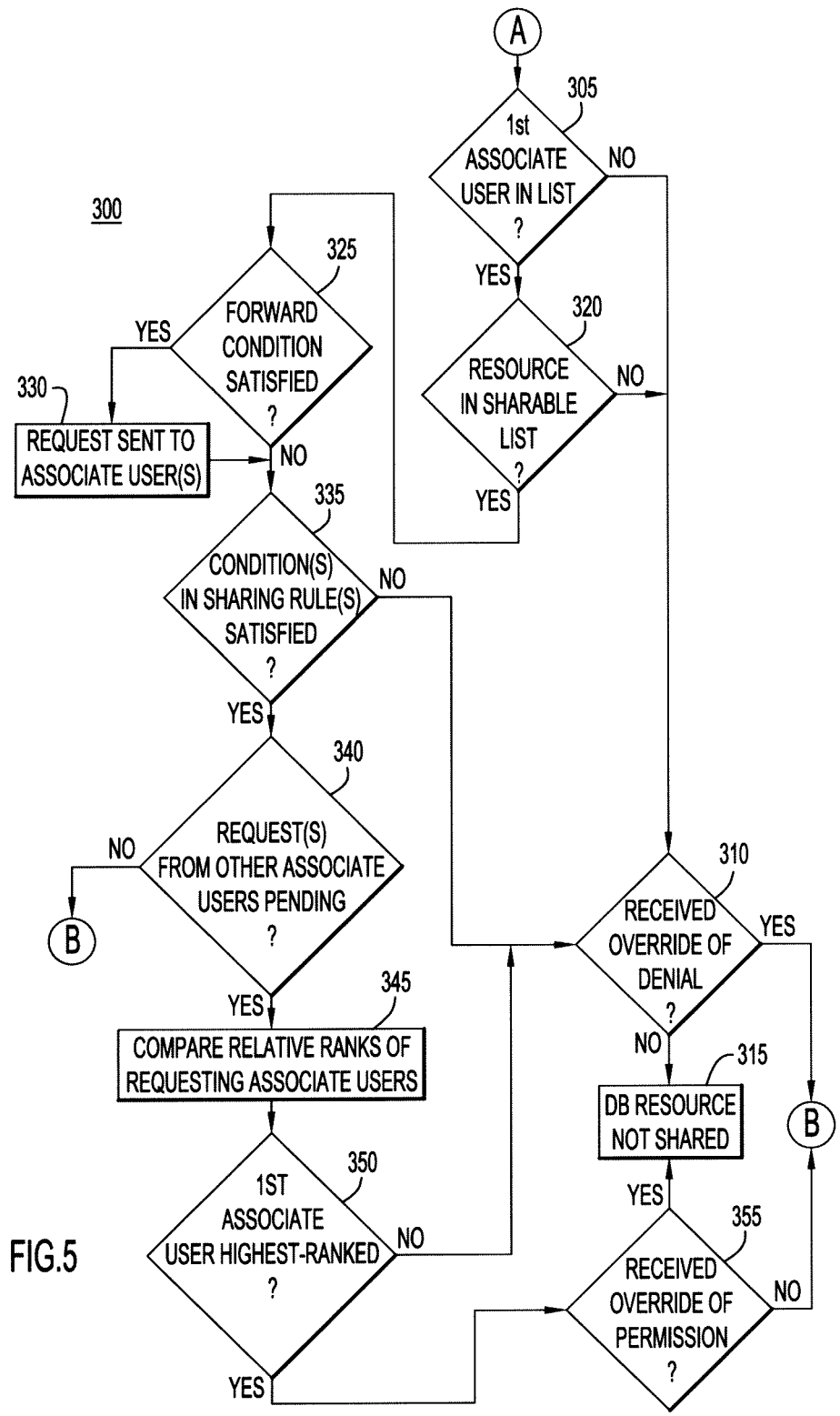
FIG. 5 is a flowchart depicting an exemplary method for evaluating a sharing profile according to an embodiment of the present invention.

In FIG. 5, reference numeral 300 generally designates a flow chart depicting an exemplary method for evaluating a sharing profile according to an embodiment of the present invention, that may be performed by the previously described system, and particularly the cloud database manager 104. The cloud database manager in step 305 determines if the first associate user is a member of the list of associate users in the sharing profile, and if not, proceeds to step 310 and determines if a override request has been received. If an override request was received, the cloud database manager proceeds to point B and returns to process 200 as described previously with reference to FIG. 3, and if not, the cloud database manager proceeds to step 315 and refuses to share the resource. If the first associate user is a member, the cloud database manager proceeds to step 320 and determines if the requested resource is in the list of sharable cloud data resources in the sharing profile, and if not, proceeds to step 310 as described previously. If the requested resource is in the list, then the cloud database manager proceeds to step 325 and determines if a forward condition is satisfied, and if yes, then in step 330 forwards the first sharing request to one or more associates in the list of associates. The forward condition can be selected as a sharing rule by the primary user when creating or modifying her sharing profile, or can be set by a cloud data network administrator. The forward condition can forward only certain types of requests, for example "charity" requests that the primary user determines to be a worthy cause, such as a request from a non-profit group, school, medical center, or the like, or can forward any type of request, as desired by the primary user.

After forwarding the request in step 330, or if the forward condition was not satisfied, the cloud database manager in step 335 determines if the conditions specified in the sharing rules in the sharing profile are satisfied. These conditions may be any condition desired by the primary user, for example, an authorization for all associate users to share all resources, a prohibition on sharing certain resources with certain associate users, a directive to ignore certain people or requests for certain resources, a requirement that shared resources be used only for certain purposes, etc. If the conditions are not satisfied, the cloud database manager proceeds to step 310 as described previously, but if they are satisfied, proceeds to step 340. In step 340, the cloud database manager determines if one or more requests from other associate users are concurrently pending, that is, are requesting the same resource at times that overlap to any degree. If not, the cloud database manager proceeds to point B and returns to process 200 as described previously with reference to FIG. 3, but if yes, proceeds to step 345 and compares the relative ranks of each associate user who has submitted a sharing request. In step 350, the cloud database manager determines if the first associate user is the highest-ranked associate user, and if not, proceeds to step 310 as described previously, and if yes, proceeds to step 355 and determines if a override request has been received. If an override request was received, the cloud database manager proceeds to step 315 and refuses to share the resource, but if no override request was received, proceeds to point B and returns to process 200 as described previously with reference to FIG. 3.

In FIG. 6, reference numeral 400 generally designates a flow chart depicting an exemplary method for creating or modifying a sharing profile according to an embodiment of the present invention, that may be performed by the previously described system, and particularly the cloud database manager 104. In step 405 the cloud database manager receives a request to create or modify a sharing profile for the primary user, either from the primary user or as directed by another process. In step 410 the cloud database manager determines if a sharing profile already exists for the primary user, and if not, proceeds to step 415 and creates a new profile and then proceeds to step 420. If yes, the cloud database manager retrieves the sharing profile from the profile storage area, proceeds to step 420 and receives a selection of one or more cloud data resources owned by the primary user, and in response to receiving the selection, updates the list of sharable cloud data resources with the selected cloud data resources in step 425. In step 430, the cloud database manager receives a selection of social networks, and then for each social network selected, in step 435 receives a selection of associates of the primary user from the selected social network and updates the list of associate users with the selected associates in step 440. The selection of associates can be made by the primary user, or can be automatically selected by the cloud data manager, for example by pulling a list of the primary user's associates from the social network via a link, e.g., via Facebook Connect.

In step 445 the cloud database manager determines if associates have been processed for all of the selected social networks, and if not, returns to step 435 to process the remaining social networks. If yes, the cloud database manager proceeds to step 450 where each associate in the list is ranked. The ranking may be automatic, for example by awarding an associate user who is an associate of the primary user on multiple social networks a higher ranking than an associate user who is an associate of the primary user on a single social network, or may be manual, for example by permitting the primary user to assign relative ranks to associate users individually, in groups (e.g., Facebook friends are ranked higher than LinkedIn connections), or in any suitable fashion. In step 455, the cloud database manager receives a selection of sharing rules, which may include any sharing rule discussed herein, for example a maximum number of sharing requests per a predetermined time period, a return condition, a forward condition, limitations on which associates may share which resources, etc. In step 460 the cloud database manager saves the sharing profile comprising the list of sharable cloud data resources, list of associates and the selected one or more sharing rules in the profile storage area, and the process ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for sharing cloud data resources among associated users comprising:
    receiving a first sharing request from a first associate user to share a first cloud data resource owned by a primary user, wherein the first associate user and the primary user are associates of each other in a first social network;
    receiving one or more sharing requests from other associate users to share the first cloud data resource, wherein each other associate user is an associate of the primary user in a second social network, wherein the first and second social networks may be the same or different;
    in response to receiving the first sharing request, retrieving a sharing profile associated with the primary user from a storage area, wherein the sharing profile comprises a list of sharable cloud data resources owned by the primary user, a list of associate users who are associates of the primary user from one or more social networks, wherein the list of associate users specifies a rank for each associate user relative to each other associate user in the list, and one or more sharing rules, wherein each sharing rule specifies a condition on which an associate user member of the list of associates is permitted to share one or more cloud data resources from the list of sharable cloud data resources; and
    in response to retrieving the sharing profile, evaluating the first sharing request by determining if the conditions in the sharing rules are satisfied, and by comparing the rank for the first associate user and said other associate users, wherein if all of the conditions of each sharing rule in the sharing profile are satisfied, and the first associate user is relatively higher-ranked than any of said other associate users, then the first cloud data resource is made available for sharing by the first associate user, and wherein if the first associate user is lower-ranked than any of said other associate users, or if one or more of the conditions of the sharing rules are not satisfied, then the first sharing request is denied and the first associate user is not permitted to share the first cloud data resource.

2. The method of claim 1, further comprising:
    receiving a profile request from the primary user to create or modify the sharing profile;
    in response to receiving the request, creating the sharing profile if it does not yet exist, or retrieving the sharing profile from the storage area if it already exists;
    receiving a selection of one or more cloud data resources owned by the primary user and updating the list of sharable cloud data resources with the selected cloud data resources;
    receiving a list of one or more social networks, and for each social network, receiving a selection of associate users of the primary user and updating the list of associate users with the selected associate users;
    receiving a selection of one or more sharing rules; and
    saving the sharing profile comprising the list of sharable cloud data resources, list of associate users and the selected one or more sharing rules in the storage area.

3. The method of claim 1, wherein one of the one or more sharing rules specifies a maximum number of sharing requests that are permitted for a predetermined time period, and wherein said evaluation further comprises determining whether the maximum number of sharing requests has been exceeded for the predetermined time period, and if yes, denying the first sharing request.

4. The method of claim 1, further comprising:
    in response to retrieving the sharing profile, evaluating whether the first sharing request satisfies a forwarding condition, wherein one of the one or more sharing rules specifies the forwarding condition for the first associate user; and
    in response to said determination that the forwarding condition is satisfied, forwarding the first sharing request to one or more associate users in the list of associate users of the primary user.

5. The method of claim 1, further comprising:
in response to the requested cloud data resource being made available for sharing, determining whether the first associate user has allocated the requested cloud data resource within a predetermined time limit, and if not, rescinding the availability of the requested cloud data resource.

6. The method of claim 1, further comprising:
in response to the requested cloud data resource being made available for sharing, monitoring the first associate user's allocation of the requested cloud data resource to determine if a return condition is satisfied, wherein one of the one or more sharing rules specifies the return condition for the requested cloud data resource; and
in response to said determination that the return condition is satisfied, rescinding the availability of the requested cloud data resource.

7. The method of claim 1, further comprising:
in response to receiving the first sharing request, notifying the primary user that a request was made for the first cloud data resource;
in response to said notification, receiving an override request from the primary user, wherein the override request specifies whether to permit or deny the first sharing request; and
in response to receiving the override request, overriding said evaluation by permitting the first sharing request if the override request specifies to permit the first sharing request, and denying the first sharing request if the override request specifies to deny the first sharing request.

8. The method of claim 1, wherein the first cloud data resource is a virtual machine or a portion thereof.

9. The method of claim 1, wherein the first cloud data resource is a processor or memory.

10. The method of claim 1, wherein the first cloud data resource is selected from the group consisting of database applications, data objects, data storage resources, and portions thereof.

11. A computer program product for sharing cloud data resources among associated users comprising:
a computer readable storage device having computer readable program code stored thereon, the computer readable program code comprising computer readable program code configured to:
receive a first sharing request from a first associate user to share a first cloud data resource owned by a primary user, wherein the first associate and primary users are associates of each other in a first social network;
receive one or more sharing requests from other associate users to share the first cloud data resource, wherein each other associate user is an associate of the primary user in a second social network, wherein the first and second social networks may be the same or different;
in response to receiving the first sharing request, retrieve a sharing profile associated with the primary user from a storage area, wherein the sharing profile comprises a list of sharable cloud data resources owned by the primary user, a list of associate users who are associates of the primary user from one or more social networks, wherein the list of associate users specifies a rank for each associate user relative to each other associate user in the list, and one or more sharing rules, wherein each sharing rule specifies a condition on which an associate user member of the list of associates is permitted to share one or more cloud data resources from the list of sharable cloud data resources; and
in response to retrieving the sharing profile, evaluate the first sharing request by determining if the conditions in the sharing rules are satisfied, and by comparing the rank for the first associate user and said other associate users,
wherein if all of the conditions of each sharing rule in the sharing profile are satisfied, and the first associate user is relatively higher-ranked than any of said other associate users, then the first cloud data resource is made available for sharing by the first associate user, and
wherein if the first associate user is lower-ranked than any of said other associate users, or if one or more of the conditions of the sharing rules are not satisfied, then the first sharing request is denied and the first associate user is not permitted to share the first cloud data resource.

12. The computer program product of claim 11, wherein the computer readable program code is further configured to:
receive a profile request from the primary user to create or modify the sharing profile;
in response to receiving the request, create the sharing profile if it does not yet exist, or retrieve the sharing profile from the storage area if it already exists;
receive a selection of one or more cloud data resources owned by the primary user and update the list of sharable cloud data resources with the selected cloud data resources;
receive a list of one or more social networks, and for each social network, receive a selection of associate users of the primary user and update the list of associate users with the selected associate users;
receive a selection of one or more sharing rules; and
save the sharing profile comprising the list of sharable cloud data resources, list of associate users and the selected one or more sharing rules in the storage area.

13. The computer program product of claim 11, wherein the computer readable program code is further configured to:
in response to retrieving the sharing profile, evaluate whether the first sharing request satisfies a forwarding condition, wherein one of the one or more sharing rules specifies the forwarding condition for the first user; and
in response to said determination that the forwarding condition is satisfied, forward the first sharing request to one or more associate users in the list of associate users.

14. The computer program product of claim 11, wherein the computer readable program code is further configured to:
in response to the requested cloud data resource being made available for sharing, determine whether the first associate user has allocated the requested cloud data resource, and if yes, notify the primary user that the first associate user is sharing the requested cloud data resource;
in response to said notification, receive a revocation request from the primary user; and
in response to receiving the revocation request, rescind the availability of the requested cloud data resource.

15. The computer program product of claim 11, wherein the first cloud data resource is a database application or portion thereof.

16. The computer program product of claim 11, wherein the first cloud data resource is a data object selected from the group consisting of tables, indexes, stored queries, data files, log files, control files, and backup files.

17. The computer program product of claim 11, wherein the first cloud data resource is a data storage resource selected from the group consisting of a database cluster, tablespace, or memory space.

18. A system comprising:
a memory having a sharing profile associated with a primary user stored therein, wherein the sharing profile comprises a list of sharable cloud data resources owned by the primary user, a list of associate users who are associates of the primary user from one or more social networks, wherein the list of associate users specifies a rank for each associate user in the list, and one or more sharing rules, wherein each sharing rule specifies a condition on which an associate user member of the list of associate users is permitted to share one or more cloud data resources from the list of sharable cloud data resources; and
a processor configured with logic to:
receive a first sharing request from a first associate user to share a first cloud data resource from the list of sharable cloud data resources, wherein the first associate user is a member of the list of associates;
receive one or more sharing requests from other associate users to share the first cloud data resource, wherein each other associate user is a member of the list of associates;
in response to receiving the first sharing request, retrieve the sharing profile from the memory; and
in response to retrieving the sharing profile, evaluate the first sharing request by determining if the conditions in the sharing rules are satisfied, and by comparing the rank for the first associate user and other associate users relative to each other,
wherein if all of the conditions of each sharing rule in the sharing profile are satisfied, and the first associate user is relatively higher-ranked than any of said other associate users, then the first cloud data resource is made available for sharing by the first associate user, and
wherein if the first associate user is lower-ranked than any of said other associate users, or if one or more of the conditions of the sharing rules are not satisfied, then the first sharing request is denied and the first associate user is not permitted to share the first cloud data resource.

19. The system of claim 18, wherein the processor is further configured with the logic to:
receive a profile request from the primary user to create or modify the sharing profile;
in response to receiving the request, create the sharing profile if it does not yet exist, or retrieve the sharing profile from the memory if it already exists;
receive a selection of One or more cloud data resources owned by the primary user and update the list of sharable cloud data resources with the selected cloud data resources;
receive a list of one or more social networks, and for each social network, receive a selection of associate users of the primary user and update the list of associate users with the selected associate users;
receive a selection of one or more sharing rules; and
save the sharing profile comprising the list of sharable cloud data resources, list of associate users and the selected one or more sharing rules in the memory.

20. The system of claim 18, wherein the first cloud data resource is a database application or portion thereof.

21. The system of claim 18, wherein the first cloud data resource is a data object.

* * * * *